United States Patent
Ohyama et al.

(10) Patent No.: US 6,489,402 B2
(45) Date of Patent: Dec. 3, 2002

(54) VIBRATION INSULATOR FROM PARTIALLY CROSSLINKED BUTYL RUBBER

(75) Inventors: Hiroshi Ohyama, Fukuchiyama (JP); Ryo Ogawa, Fukuchiyama (JP); Hiroyuki Maruko, Fukuchiyama (JP); Hiroshi Kuramochi, Kawaguchi (JP)

(73) Assignee: Yamauchi Corporation, Osaka-fu (JP)

(*) Notice: Subject to any disclaimer, the term of this patent is extended or adjusted under 35 U.S.C. 154(b) by 0 days.

(21) Appl. No.: 09/364,059

(22) Filed: Jul. 30, 1999

(65) Prior Publication Data

US 2002/0019478 A1 Feb. 14, 2002

(30) Foreign Application Priority Data

Jul. 31, 1998 (JP) ............................................. 10-217065

(51) Int. Cl.⁷ .......................... C08L 23/22; C08L 9/00; F16F 15/04; C08J 3/24
(52) U.S. Cl. ................. 525/332.5; 525/332.8; 524/574
(58) Field of Search ................. 524/574; 525/332.8, 525/332.5

(56) References Cited

U.S. PATENT DOCUMENTS

| | | | | |
|---|---|---|---|---|
| 3,674,735 A | * | 7/1972 | Callan | 260/33.6 |
| 3,767,503 A | * | 10/1973 | Maddalena | 156/244 |
| 4,429,068 A | * | 1/1984 | Nakahara | 524/302 |
| 4,919,183 A | * | 4/1990 | Dobson | 152/502 |
| 5,663,230 A | * | 9/1997 | Haman | 524/447 |
| 5,840,797 A | * | 11/1998 | Singh | 524/495 |

FOREIGN PATENT DOCUMENTS

| | | | |
|---|---|---|---|
| CN | 1092796 A | | 9/1994 |
| GB | 2045793 | * | 11/1980 |
| JP | 60-43865 | | 11/1980 |
| JP | 56043380 | * | 4/1981 |
| JP | 57100947 | * | 6/1982 |
| JP | 63-72795 | | 10/1986 |
| JP | 6-172547 | | 8/1992 |
| JP | 06107738 | * | 4/1994 |
| JP | 6-107738 | | 4/1994 |
| JP | 7-52435 | | 11/1995 |
| JP | 7-324167 | | 12/1995 |
| JP | 9-3278 | | 1/1997 |
| JP | 9-71700 | | 3/1997 |
| JP | 9-235477 | | 9/1997 |
| JP | 9-263702 | | 10/1997 |
| JP | 10036597 | * | 2/1998 |

OTHER PUBLICATIONS

Translation to JP56043380 (4/81), previously cited.*
Translationand JP10036597 (2/98), previously cited.*

* cited by examiner

Primary Examiner—David W. Wu
Assistant Examiner—Kelechi C. Egwim
(74) Attorney, Agent, or Firm—Birch, Stewart, Kolasch & Birch, LLP

(57) ABSTRACT

A rubber vibration insulator for use in a vibration insulation device integrated into precision instruments such as acoustic, computer-associated and game instruments, which insulator has a low hardness, a small compression set, a large loss tangent and a small temperature dependence and can be prepared by curing a rubber composition comprising 100 parts by weight of a partially crosslinked butyl rubber and 50 to 200 parts by weight of an extender component as well as a vulcanizing agent.

10 Claims, No Drawings

VIBRATION INSULATOR FROM PARTIALLY CROSSLINKED BUTYL RUBBER

FIELD OF THE INVENTION

The present invention relates to rubber vibration insulators having an ultra-low hardness which are used for vibration insulation of precision instruments such as acoustic, computer-associated and game instruments.

DESCRIPTION OF THE PRIOR ART

Recently, precision instruments such as acoustic, computer-associated and game instruments are often loaded with a laser disk device. The laser disk device is very sensitive to vibration, and therefore, the device is equipped with a material for vibration insulation, vibration damping or shock absorption.

In general, it is desirable for such a vibration insulator to have a low hardness, a small compression set (c-set), a large loss tangent (tan-δ) and a small temperature dependence (for example, indicated by a variation of Young's modulus in the range of 0° C. to 80° C.). Also, a raw composition used for preparing such a vibration insulator should be easily prepared (in particular, it must have a good kneading property), and should have excellent processability.

Such a vibration insulator is usually prepared from a thermoplastic or thermosetting composition. Vibration insulators prepared from a thermoplastic composition are described, for example, in JP-A-235477/1997 and JP-A-263702/1997, but the insulators have drawbacks such as a large compression set and a large temperature dependence.

On the other hand, a vibration insulator containing a butyl rubber as a major component is known as that prepared from a thermosetting composition (JP-A-3278/1997 and JP-A-71700/1997). However, the insulator has a limit in obtaining a low hardness. Thus, in order to obtain a vibration insulator having a low hardness, a large amount of an extender component such as a process oil should be added to the raw composition for the insulator. However, this measure deteriorates the kneading property of the raw composition (the raw composition adheres to rolls), and causes the bleeding of the process oil. Even if a vibration insulator having a low hardness is prepared from a raw composition using a special method, the resulting insulator has a large compression set.

Also, a vibration insulator containing polynorbornene as a major component is known as that prepared from a thermosetting composition (JP-U-72795/1988 and JP-Y-52435/1995). However, the insulator has an inferior thermal property. In addition, the kneading property of the raw composition and the bleeding property of the insulator are not satisfactory.

Furthermore, JP-B-43865/1985 discloses a vibration damper which is obtained by press molding a composition comprising a silicone rubber, a partially crosslinked butyl rubber, an extender oil and a reinforcing filler. However, the vibration dampers disclosed in this document have a hardness of 18 to 25.5 measured by a spring-type hardness tester, and therefore, the dampers do not aim at an insulator having a durometer hardness (JIS K6253) of not greater than A15 as defined by the present invention.

Moreover, JP-A-324167/1995 discloses a vibration damper which is obtained by previously mixing a low-molecular material such as a process oil and a medium material such as a thermoplastic organic polymer to prepare a first mixture containing the low-molecular material and the medium material, then mixing the first mixture with a polymer such as natural rubber to prepare a second mixture, and then vulcanizing the second mixture in the presence of a curing agent such as sulfur. Although a low hardness of 15 measured by Asker-C type hardness tester (25° C.) is realized in this vibration damper, it does not have a satisfactory compression set property.

As described above, it is desirable for a vibration insulator used in precision instruments such as acoustic, computer-associated and game instruments to have a low hardness, a small compression set, a large loss tangent and a small temperature dependence. Also, a raw composition used for preparing a vibration insulator should be easily prepared and have an excellent processability. However, conventional vibration insulators do not meet all the above requirements. Accordingly, the present inventors intended to provide a vibration insulator which meets all the above requirements.

SUMMARY OF THE INVENTION

Intensive investigation has been made in order to solve the above problem. As a result, it has been found that a partially crosslinked butyl rubber shows a good kneading property even if a large amount of an oil is added to the rubber. Also, it has been found that a partially crosslinked butyl rubber shows a high retention of the oil and can inhibit its bleeding. Furthermore, it has been found that, on crosslinking and curing such a partially crosslinked butyl rubber containing a large amount of an oil, a vibration insulator having a very low hardness, a small compression set, a large loss tangent and a small temperature dependence is obtained.

Thus, the present invention provides a rubber composition comprising 100 parts by weight of a partially crosslinked butyl rubber and 50 to 200 parts by weight of an extender component.

The rubber composition according to the present invention may further contain fillers, vulcanizing agents, processability-improving polymers and/or other additives for rubber.

Also, the present invention provides a rubber vibration insulator which is obtainable by crosslinking and curing the above rubber composition and which has a durometer hardness (JIS K6253) of not greater than A15 and preferably of not greater than A10, an Asker-C hardness of at least 10 and preferably of at least 15, a compression set (JIS K6262; 70° C.×24 hrs) of not greater than 20% and a loss tangent (25° C., 30 Hz) of at least 0.1.

DETAILED DESCRIPTION OF THE INVENTION

A partially crosslinked butyl rubber used in the present invention is, for example, one obtained by adding a vinyl aromatic compound (styrene, divinylbenzene, etc.) and an organic peroxide to a butyl rubber and partially crosslinking the butyl rubber, as described in JP-A-107738/1994, or one obtained by adding an electron withdrawing group-containing polyfunctional monomer (ethylene dimethacrylate, trimethylolpropane triacrylate, N,N'-m-phenylene dimaleimide, etc.) and an organic peroxide to a butyl rubber and partially crosslinking the butyl rubber, as described in JP-A-172547/1994.

The degree of crosslinking of these partially crosslinked butyl rubbers may be expressed as the amount of insoluble residues (gel content) not dissolved in a solvent such as diisobutylene or cyclohexane which can completely dissolve a butyl rubber in an unvulcanized state. The partially crosslinked butyl rubbers used in the present invention have a gel content in the range of 5% to 95% when using the above solvent. Among others, butyl rubbers having a higher gel content are more preferable because they can retain a larger amount of an extender component. Accordingly, the gel content of the partially crosslinked butyl rubbers is preferably in the range of 50% to 95%, and more preferably in the range of 65% to 95%.

One preferable example of partially crosslinked butyl rubber is a terpolymer comprised of isobutylene, isoprene and divinylbenzene which is partially crosslinked with divinylbenzene. Such a partially crosslinked butyl rubber is commercially available as Polysar Butyls XL 10000, XL 68102, XL 30102 and XL 40302 (Polysar International Co.). Among them, "Polysar Butyl XL 10000" which is of a highly crosslinked grade (having a gel content of 70% to 85% as measured using cyclohexane) is preferable.

An extender component used in the present invention is a softening agent for lowering the hardness of a rubber and a plasticizer usually added to a rubber composition.

Softening agents such as process oils (for example, of paraffin, naphthene and aromatic series) and vegetable oils (for example, castor, rapeseed, soybean, palm, coconut, peanut, cottonseed, pine and olive oils and Japan wax), as well as synthetic softening agents may be used in the present invention.

Plasticizers such as derivatives of phthalic, adipic, azelaic, sebacic, maleic, fumaric, trimellitic, citric, itaconic, oleic, ricinoleic, stearic, phosphoric, glutaric and glycolic acids as well as glycerin and epoxy derivatives may be used in the present invention.

Among these extender components, those having a good compatibility with the partially crosslinked butyl rubber, i.e. those having a small solubility parameter are preferable. It is also possible to use a mixture of two or more of the above components for the present invention.

An extender component is preferably a softening agent, more preferably a process oil, and most preferably process oils of a paraffin series.

The extender component is used in an amount of 50 to 200 parts by weight and preferably 70 to 150 parts by weight, per 100 parts by weight of a partially crosslinked butyl rubber. A desired low hardness is not accomplished if the amount of the extender component is less than 50 parts by weight. On the other hand, a kneading property is deteriorated and the extender component tends to easily bleed if the amount of the extender component is greater than 200 parts by weight.

A rubber composition according to the present invention may further contain fillers, vulcanizing agents, processability-improving polymers and/or other additives for rubber in addition to the above components.

Fillers are used for reinforcing a rubber material and include inorganic fillers such as carbon black, clay, talc, calcium carbonate and silica, organic fillers such as powdered cork, cellulose and ebonite, and other fillers, and reinforcing agents usually added to a rubber composition. These fillers may be used in an amount of 10 to 100 parts by weight and preferably 10 to 50 parts by weight, per 100 parts by weight of a partially crosslinked butyl rubber.

Vulcanizing agents include organic peroxides as well as vulcanizing systems usually used for vulcanization of a butyl rubber such as sulfur, quinoids, resins, sulfur donors and low-sulfur high-performance vulcanization accelerators. However, sulfur is not desirable because it corrodes other parts of instruments. On the other hand, organic peroxides provide a rubber material having a small compression set, and therefore, they are preferably used in the present invention. If the peroxides are used for crosslinking and curing conventional butyl rubbers, the main chains of the rubbers degrade and satisfactorily cured products are not obtained. Accordingly, a sulfur type vulcanizing agent was hitherto used for the vulcanization. Since, however, the present rubber composition contains a partially crosslinked butyl rubber as a main component, it is possible to use peroxides as vulcanizing agents.

Organic peroxides include, for example, 1,1-bis(t-butylperoxy)-3,3,5-trimethylcyclohexane and dicumyl peroxide. These organic peroxides may be used in an amount of 2 to 10 parts by weight and preferably 2 to 5 parts by weight, per 100 parts by weight of a partially crosslinked butyl rubber.

Processability-improving polymers are, in particular, those for improving the kneading property of a rubber composition. Such polymers include natural rubbers, synthetic rubbers (for example, IR, BR, SBR, CR, NBR, IIR, EPM, EPDM, acrylic rubber, EVA, urethane rubber, silicone rubber, and fluororubber) and thermoplastic elastomers (for example, of styrene, olefin, vinyl chloride, ester, amide, and urethane series). These processability-improving polymers may be used in an amount of 0 to 100 parts by weight, preferably 0 to 50 parts by weight and most preferably 0 to 30 parts by weight, per 100 parts by weight of a partially crosslinked butyl rubber.

Other additives for rubber include conventional additives for rubber such as anti-aging agents, anti-oxidants, lubricants and flame retarders. These additives may be used in an amount usually used.

The rubber composition of the present invention can be prepared by kneading the above components in any known manner. For example, it can be prepared using an open roll or an enclosed kneader (for example, internal mixer, kneader or Banbury mixer) by firstly masticating a partially crosslinked butyl rubber, then adding a polymer for improving the kneading property to the butyl rubber, further adding fillers, extender components, vulcanizing agents and other additives for rubber to the mixture, and kneading the resulting mixture. Kneading temperatures may be in the range of 25° C. to 120° C.

A rubber vibration insulator can be prepared from the rubber composition, for example, by compression press molding and preferably by transfer molding. Molding temperatures may be in the range of 130° C. to 170° C., and molding periods may be within 20 minutes and preferably in the range of 4 to 10 minutes.

EXAMPLES

The present invention is illustrated in more detail based on the following examples, but it is not limited thereto.

In the following examples, a type A durometer hardness was measured according to JIS K6253. In addition, the hardness by a spring-type hardness tester (Asker-C type hardness tester: Kobunsi Keiki Co.) was also measured. A measuring temperature was 24° C.

A compression set (c-set) was measured after storing a vibration insulator at 70° C. for 24 hrs according to JIS K6262.

A loss tangent (tan-δ) was measured at 25° C./30 Hz using a viscoelasticity spectrometer: type VES-F-III (Iwamoto Seisakusho Co.).

The bleeding of a process oil was evaluated by observing the cut surface of a vibration insulator after storing it at 80° C., 80% Rh for 720 hrs. The evaluation was carried out according to the following criteria:

A: no bleeding
B: slight bleeding
C: medium bleeding
D: large bleeding

The adhesion of a rubber composition to rolls when kneading the composition was evaluated according to the following criteria:

A: easily peeled off from rolls
B: peeled off with a small adhesion (no problem in workability)
C: adhesion of a comparable amount (difficult to work)
D: adhesion to both rolls (not workable)

Example 1

A rubber composition according to the present invention was prepared by kneading 95 parts by weight of a partially crosslinked butyl rubber (XL 10000: Polysar International Co.), 5 parts by weight of a styrene-butadiene rubber (SBR) (Nipol 1778J: Nippon Zeon Co., Ltd.), 120 parts by weight of a paraffin process oil, 20 parts by weight of HAF-HS Black, 1 part by weight of stearic acid and 2 parts by weight of an organic peroxide in an open roll at a temperature of 50 to 60° C. for 1.5 hrs.

A rubber vibration insulator according to the present invention was prepared by heating and crosslinking the above rubber composition using a pressing machine at 140° C. for 10 minutes.

The rubber vibration insulator had a durometer hardness of A6, an Asker-C hardness of 18, a c-set value of not greater than 10% and a tan-δ value of 0.16.

The rubber vibration insulator had a desirable bleeding property and the rubber composition had a desirable adhesive property.

Examples 2–6

Several rubber compositions were prepared by using the formulations as shown in the following Table 1 and kneading the components in the same manner as that in Example 1. Then, rubber vibration insulators were prepared from the rubber compositions.

The results of the measurement of the durometer hardness, Asker-C hardness, compression set and loss tangent as well as the results of evaluating the bleeding of the process oil and the adhesion to rolls when kneading are shown in the following Table 2.

Comparative Examples 1–3

Several rubber compositions were prepared by using the formulations as shown in the following Table 1 and kneading the components in the same manner as that in Example 1. Then, rubber vibration insulators were prepared from the rubber compositions.

The results of the measurement of the durometer hardness, Asker-C hardness, compression set and loss tangent as well as the results of evaluating the bleeding of the process oil and the adhesion to rolls when kneading are shown in the following Table 2.

TABLE 1

| Components | Examples | | | | | | Comparative examples | | |
| --- | --- | --- | --- | --- | --- | --- | --- | --- | --- |
| | 1 | 2 | 3 | 4 | 5 | 6 | 1 | 2 | 3 |
| Partially crosslinked butyl rubber *1 | 95 | 90 | 85 | 90 | 100 | 85 | | | |
| SBR *2 | 5 | 10 | | | | | | | |
| IIR *3 | | | 15 | | | 15 | 100 | | |
| EPDM *4 | | | | | | | | 175 | |
| Polynorbornene *5 | | | | | | | | | 100 |
| Thermoplastic elastomer *6 | | | | 10 | | | | | |
| Paraffin process oil | 120 | 100 | 100 | 100 | 110 | 55 | 60 | 170 | |
| Naphthene process oil | | | | | | | | | 250 |
| HAF-HS Black | 20 | 20 | 20 | 20 | 20 | 40 | 15 | 30 | |
| Acetylene black | | | | | | | | | 50 |
| Stearic acid | 1 | 1 | 1 | 1 | 1 | 1 | 1 | 1 | 1 |
| Zinc oxide | | | | | | | 5 | | 5 |
| Peroxide | 2 | 2 | 2 | 2 | 3 | 2 | | | |
| Sulfur | | | | | | | 2 | 2 | 2 |
| Thiazole vulcanization accelerator | | | | | | | 1 | 4 | 4 |
| Total | 243 | 223 | 223 | 223 | 234 | 198 | 184 | 382 | 412 |

*1: XL 10000 (Polysar International Co.)
*2: Styrene-butadiene rubber Nipol 1778J (Nippon Zeon Co., Ltd.)
*3: Butyl rubber Butyl-268 (JSR Corporation)
*4: Ethylene-propylene-diene terpolymer EP-98 (JSR Corporation) (Containing 75 parts by weight of process oil relative to 100 parts by weight of polymer)
*5: Norsorex (Nippon Zeon Co., Ltd.)
*6: Styrene/ethylene/propylene/styrene block copolymer

TABLE 2

|  | Examples | | | | | | Comparative examples | | |
| --- | --- | --- | --- | --- | --- | --- | --- | --- | --- |
| Properties | 1 | 2 | 3 | 4 | 5 | 6 | 1 | 2 | 3 |
| Type A hardness | 6 | 6 | 4 | 4 | 4 | 15 | 8 | 8 | 8 |
| Asker C hardness | 18 | 20 | 16 | 15 | 16 | 39 | 26 | 25 | 25 |
| Compression set | <10% | 7% | 8% | 7% | 6% | 10% | 22% | 70% | 19% |
| Loss tangent | 0.160 | 0.190 | 0.200 | 0.188 | 0.210 | 0.240 | 0.210 | 0.105 | 0.140 |
| Bleeding of process oil | A | A | A | A | A | A | C | D | B |
| Adhesion to rolls when kneading | A | A | A | A | B | A | D | D | C |

As can be seen from Table 2, rubber vibration insulators having a low hardness, a small compression set and a large loss tangent could be obtained by crosslinking and curing the rubber compositions according to the present invention. In addition, the rubber vibration insulators were free of the problematic bleeding of a process oil. Moreover, the rubber compositions were free of the problematic adhesion to rolls when kneading.

On the other hand, the rubber vibration insulators and the rubber compositions of the comparative examples did not satisfy all the test items (i.e. low hardness as well as compression set, loss tangent, bleeding of process oil and adhesion to rolls when kneading).

The crosslinking and curing of a rubber composition according to the present invention provide a rubber vibration insulator having a durometer hardness (JIS K6253) of not greater than A15, an Asker-C hardness of at least 10, a compression set (JIS K6262; 70° C.×24 hrs) of not greater than 20% and a loss tangent (25° C., 30 Hz) of at least 0.1. The rubber vibration insulator having these properties is particularly suitable for use to insulate a device such as CD, MD, CD-ROM, CD-R, CD-RW, DVD-ROM and DVD-RAM integrated into acoustic, computer-associated or game instruments from vibration.

Although the rubber composition and the rubber vibration insulator according to the present invention contain a large amount of an extender component, the rubber composition shows a good kneading property and the rubber vibration insulator shows a high retention of the extender component and can inhibit its bleeding.

What is claimed is:

1. A rubber vibration insulator which has a durometer hardness (JIS K62531) of not greater than A15, an Asker-C hardness of at least 10, a compression set (JIS K6262 measured at 70° C. for 24 hrs) of not greater than 20% and a loss tangent measured at 25° C. at 30 Hz of at least 0.1, which insulator is obtained by curing by compression press molding a rubber composition comprising 100 parts by weight of a partially crosslinked butyl rubber, 0 to 100 parts by weight of a processability-improving polymer per 100 parts by weight of said partially crosslinked butyl rubber and 64.7 to 126.3 parts by weight of an extender component per 100 parts by weight of said partially crosslinked butyl rubber as well as a vulcanizing agent.

2. The rubber vibration insulator according to claim 1, wherein the rubber composition further contains at least one component selected from the group consisting of fillers and other additives for the rubber.

3. The rubber vibration insulator according to any one of claims 1 or 2 wherein the molding temperature is in the range of 130° C. to 170° C.

4. The rubber vibration insulator according to any one of claims 1 or 2 wherein the processability improving polymer is present in an amount of from 0 to 50 parts by weight per 100 parts by weight of a partially crosslinked butyl rubber.

5. The rubber vibration insulator according to claim 3 wherein the processability improving polymer is present in an amount of from 0 to 50 parts by weight per 100 parts by weight of a partially crosslinked butyl rubber.

6. A method of preparing a rubber vibration insulator which has a durometer hardness (JIS K6253) of not greater than A15, an Asker-C hardness of at least 10, a compression set (JIS K6262 measured at 70° C. for 24 hrs) of not greater than 20% and a loss tangent measured at 25° C. at 30 Hz of at least 0.1, which method comprises curing by compression press molding a rubber composition comprising 100 parts by weight of a partially crosslinked butyl rubber, 0 to 100 parts by weight of a processability-improving polymer per 100 parts by weight of said partially crosslinked butyl rubber and 64.7 to 126.3 parts by weight of an extender component per 100 parts by weight of said partially crosslinked butyl rubber as well as a vulcanizing agent.

7. The method according to claim 6, wherein the rubber composition further contains at least one component selected from the group consisting of fillers and other rubber additives.

8. The method according to any one of claims 6 and 7 wherein the molding temperature is in the range of from 130° C. to 170° C.

9. The method according to any one of claims 6 or 7 wherein the processability-improving polymer is present in an amount of from 0 to 50 parts by weight per 100 parts by weight of a partially crosslinked butyl rubber.

10. The method according to claim 8 wherein the processability-improving polymer is present in an amount of from 0 to 50 parts by weight per 100 parts by weight of a partially crosslinked butyl rubber.

* * * * *